United States Patent
Ban et al.

(10) Patent No.: US 6,793,384 B2
(45) Date of Patent: Sep. 21, 2004

(54) TAIL LAMP STRUCTURE FOR MOTORCYCLE

(75) Inventors: Tetsuo Ban, Saitama (JP); Yumio Shibata, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/214,710

(22) Filed: Aug. 9, 2002

(65) Prior Publication Data

US 2003/0063472 A1 Apr. 3, 2003

(30) Foreign Application Priority Data

Aug. 21, 2001 (JP) ........................................ 2001-250576

(51) Int. Cl.$^7$ ................................................. B62J 6/04
(52) U.S. Cl. ........................ 362/473; 362/541; 362/544
(58) Field of Search ................................. 362/473, 540, 362/541, 543–545; 340/475, 479

(56) References Cited

U.S. PATENT DOCUMENTS 6,257,362 B1 * 7/2001 Scherbarth .................. 180/219

FOREIGN PATENT DOCUMENTS

| FR | 732465 A | | 9/1932 | |
|---|---|---|---|---|
| JP | 59073334 A | * | 4/1984 | .................. 362/473 |
| JP | 3193580 A | * | 8/1991 | .................. 362/473 |
| JP | 3220035 A | * | 9/1991 | .................. 362/473 |
| JP | 5-278655 A | | 10/1993 | |
| JP | 6156341 A | * | 6/1994 | .................. 362/473 |
| JP | 6191451 A | * | 7/1994 | .................. 362/473 |
| JP | 6-298145 A | | 10/1994 | |
| JP | 8-40329 A | | 2/1996 | |

OTHER PUBLICATIONS

English language translation of the Abstract for Japanese Patent Publication No. 08040329, dated Feb. 13, 1996.
English language translation of the Abstract for Japanese Patent Publication No. 05278655, dated Oct. 26, 1993.

* cited by examiner

*Primary Examiner*—Alan Cariaso
(74) *Attorney, Agent, or Firm*—Birch, Stewart, Kolasch & Birch, LLP (57) ABSTRACT

A tail lamp unit is disposed inside a rear end portion of a rear cowl of a motorcycle. The rear end portion has a shape whose lateral width narrows or tapers toward an upper end of the rear cowl. A tail lamp is disposed on an upper portion of the tail lamp structure and a brake lamp is disposed beneath the tail lamp, thereby ensuring a sufficient lighting area of the brake lamp.

19 Claims, 10 Drawing Sheets

TAIL LAMP STRUCTURE FOR MOTORCYCLE

BACKGROUND OF THE INVENTION

CROSS-REFERENCES TO RELATED APPLICATIONS

This nonprovisional application claims priority under 35 U.S.C. § 119(a) on patent application Ser. No. 2001-250576 filed in Japan on Aug. 21, 2001, the entirety of which is herein incorporated by reference.

1. Field of the Invention

The present invention relates to a motorcycle, and more particularly to a tail lamp structure for a motorcycle.

2. Description of the Background Art

Tail lamp structures for motorcycles have been described, for example, in Japanese Patent Laid-open No. Hei 5-278655, the entirety of which is hereby incorporated by reference. The tail lamp structures of this type are generally configured such that a tail lamp, e.g., that lights up for signifying the presence of the motorcycle to a vehicle running behind the motorcycle, and a brake lamp, e.g., that lights up for signifying a braking operation of the motorcycle, light up through the use of a common bulb provided in a single lamp cover.

Tail lamp structures for motorcycles of another type have been disclosed, for example, in Japanese Patent Laid-open No. Hei 8-40329, the entirety of which is hereby incorporated by reference. The tail lamp structures for motorcycles of this type are configured such that a tail lamp and a brake lamp are provided with separate bulbs. The brake lamp is generally disposed on an upper portion of the tail lamp structure and the tail lamp is disposed under the brake lamp.

In the aforementioned tail lamp structures, each of the tail lamp and the brake lamp light ups by using a bulb. Therefore, the required size of the tail lamp structure is relatively large and the design of the tail lamp and its vicinity at a rear end portion of a rear cowl is thereby limited. The enlargement of a tail lamp structure disposed inside a rear end portion of a rear cowl makes it difficult to achieve a thin light design for a tail lamp. In particular, the above-described tail lamp structure of the type relying upon a tail lamp and a brake lamp using different bulbs significantly limits the size and structure of the tail lamp and its vicinity.

SUMMARY OF THE INVENTION

The present invention overcomes the shortcomings associated with the background art and achieves other advantages not realized by the background art.

An object of the present invention is to provide a tail lamp structure for a motorcycle that is capable of sufficiently ensuring a lighting area of a brake lamp even if the tail lamp structure is disposed inside a rear end portion of a rear cowl.

An additional object of the present invention is to provide a tail lamp structure having a shape whose lateral width becomes narrow toward an upper end of the rear cowl.

An additional object of the present invention is to provide a tail lamp structure including a tail lamp and a brake lamp separately provided, wherein the thickness of each of the lamps in the vertical direction is made relatively thin for miniaturizing the entire tail lamp structure.

An additional object of the present applicant is to provide a tail lamp and a brake lamp made up of an array(s) of a plurality of LEDs (Light Emitting Diodes). The present inventors have determined that the use of LEDs is effective to make each of the tail lamp, the brake lamp and the rear end portion of the rear cowl relatively thin and compact.

An additional object of the present invention is to provide a brake lamp disposed on an upper portion of the tail lamp structure and the tail lamp under the brake lamp in accordance with the same manner as the above-described systems of the background art. However, the present invention seeks to avoid the problem of failing to provide a brake lamp disposed on the upper side with sufficient lighting area.

One or more of these and other objects are accomplished by a tail lamp structure for a motorcycle, the tail lamp structure comprising a tail lamp unit having an upper tail lamp portion and a lower tail lamp portion; a rear cowl having a rear end portion and an upper end, the rear end portion having a tapered shape with a lateral width narrowing toward the upper end of the rear cowl; and a tail lamp being disposed in the upper tail lamp portion and a brake lamp being disposed in the lower tail lamp portion.

One or more of these and other objects are further accomplished by a tail lamp structure for a motorcycle having a first rear fender and a second rear fender, wherein the second rear fender is mounted to a rear portion of the first rear fender, the tail lamp structure comprising a tail lamp unit having an upper tail lamp portion and a lower tail lamp portion; a rear cowl having a rear end portion and an upper end, the rear end portion having a tapered shape with a lateral width narrowing toward the upper end of the rear cowl; and a tail lamp being disposed in the upper tail lamp portion and a brake lamp being disposed in the lower tail lamp portion; and a pair of left and right rear blinkers mounted to a boundary portion between the first rear fender and the second rear fender.

Since the tail lamp is disposed on an upper portion of the tail lamp structure and the brake lamp is disposed under the tail lamp, even if the tail lamp structure is disposed inside the rear end portion of the rear cowl, e.g., the portion having a shape whose lateral width becomes narrow toward an upper end of the rear cowl, it is possible to ensure a sufficient lighting area of the brake lamp.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. A tail lamp structure for a motorcycle according to a first embodiment of the present invention will be described hereinafter with reference to the drawings. It is to be noted that in the following description, the orientation of each component, e.g., from front to rear, from left to right, etc. . . . , is based on the running direction of the vehicular body.

Figure 1:
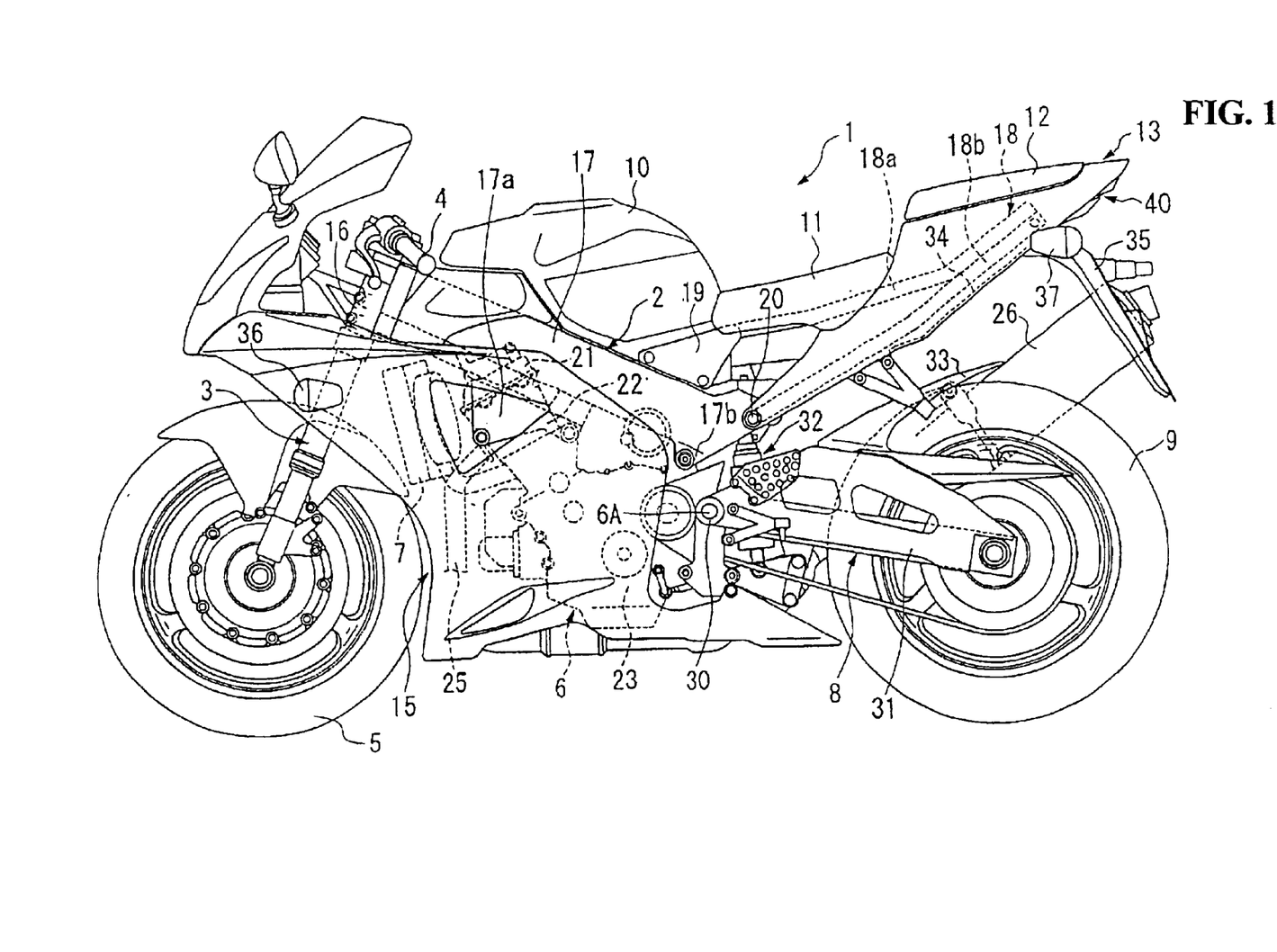
FIG. 1 is a side view showing a motorcycle incorporating a tail lamp structure according to a first embodiment of the present invention.
Figure 2:
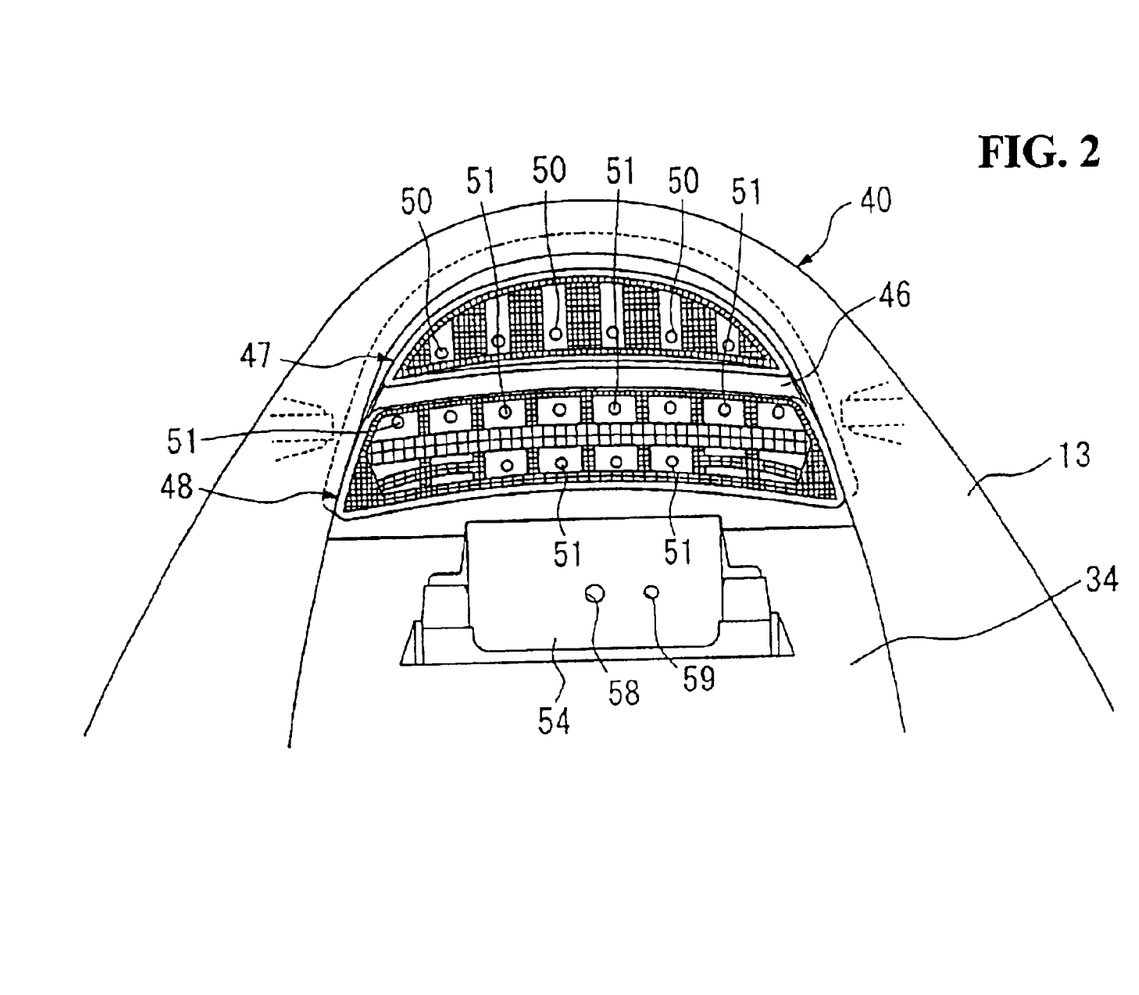
FIG. 2 is a rear view showing the tail lamp structure for a motorcycle according to the first embodiment of the present invention.
Figure 3:
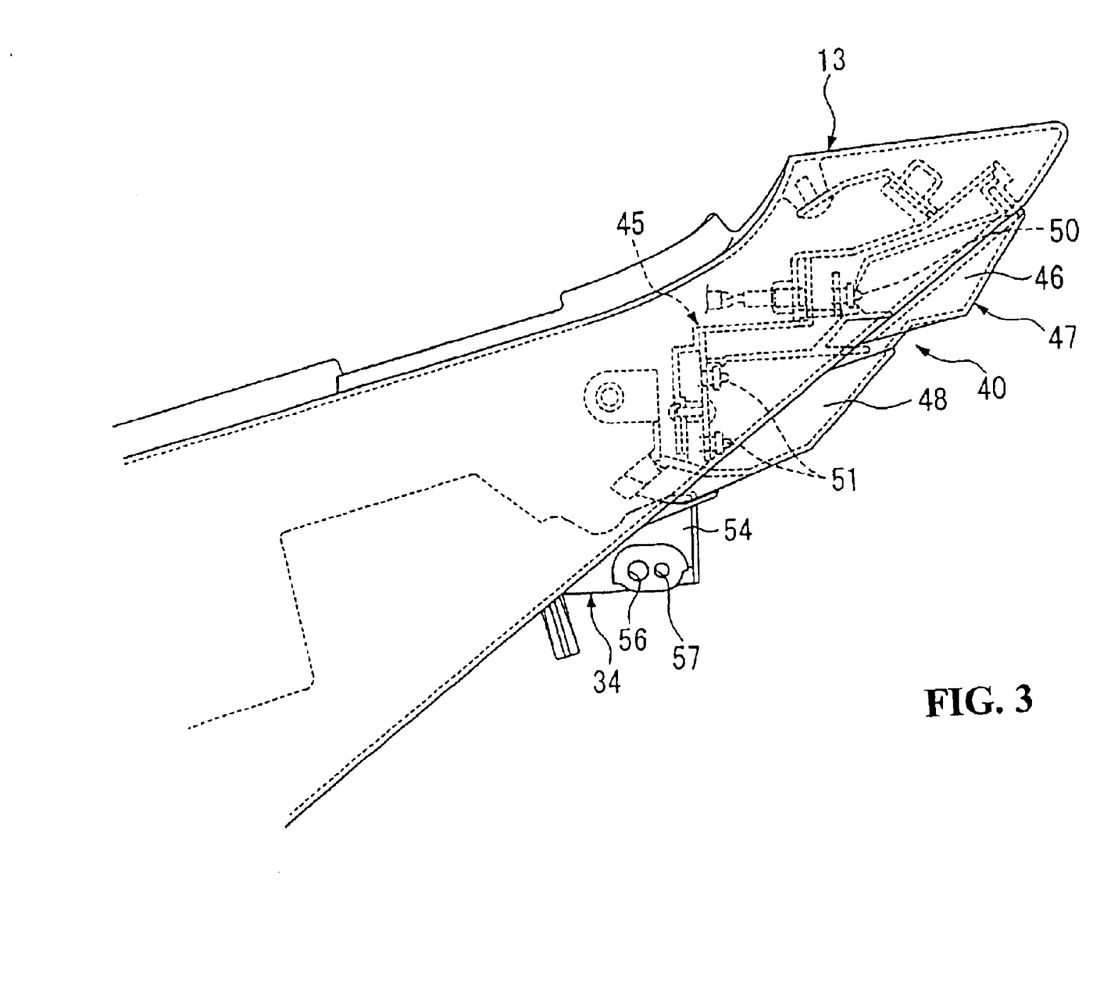
FIG. 3 is a side view showing the tail lamp structure for a motorcycle according to the first embodiment of the present invention.
Figure 4:
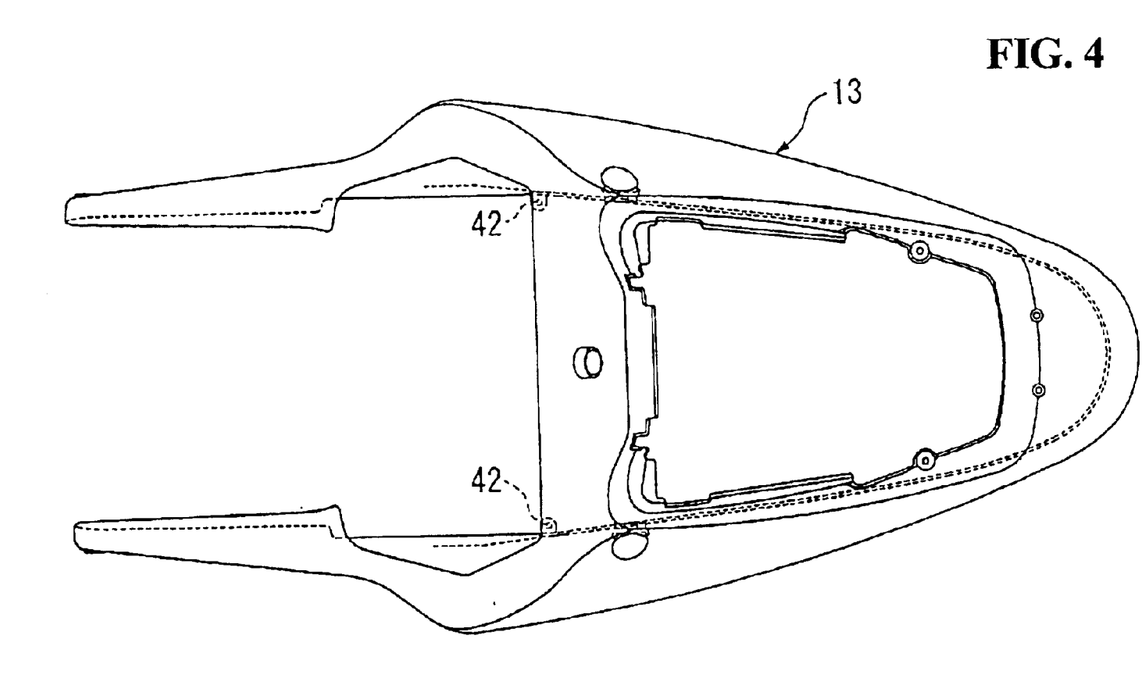
FIG. 4 is a plan view showing a rear cowl of the tail lamp structure for a motorcycle according to the first embodiment of the present invention.
Figure 5:
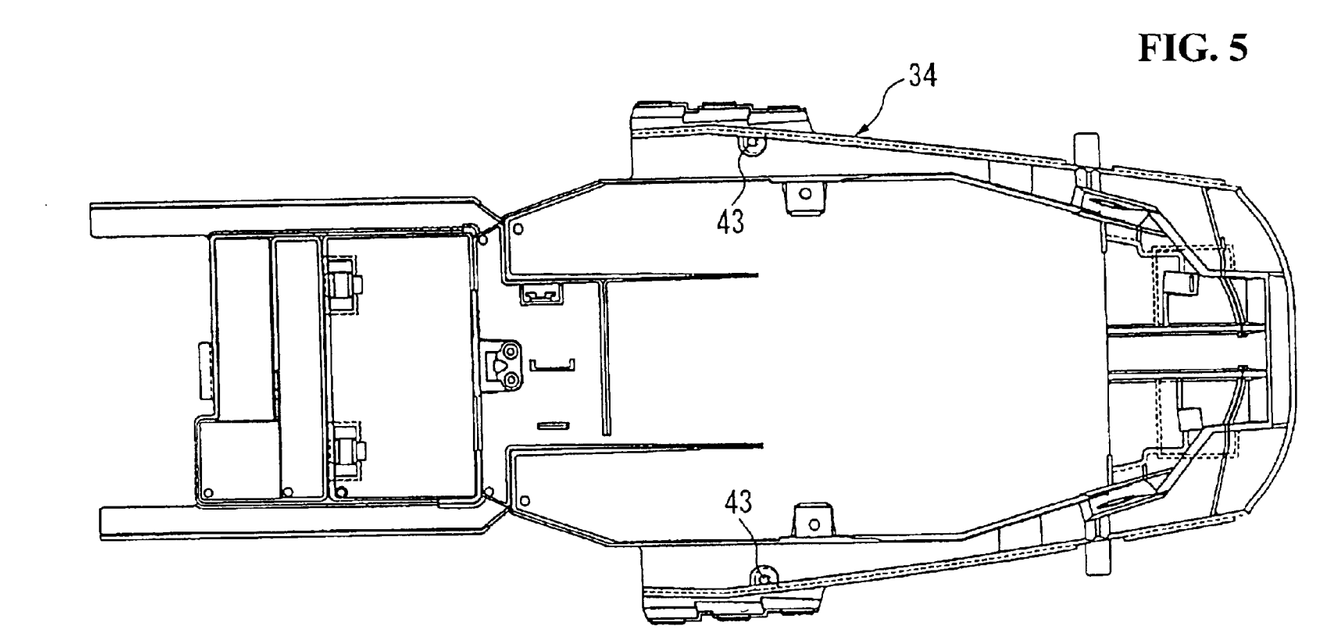
FIG. 5 is a plan view showing a rear fender of the tail lamp structure for a motorcycle according to the first embodiment of the present invention.
Figure 6:
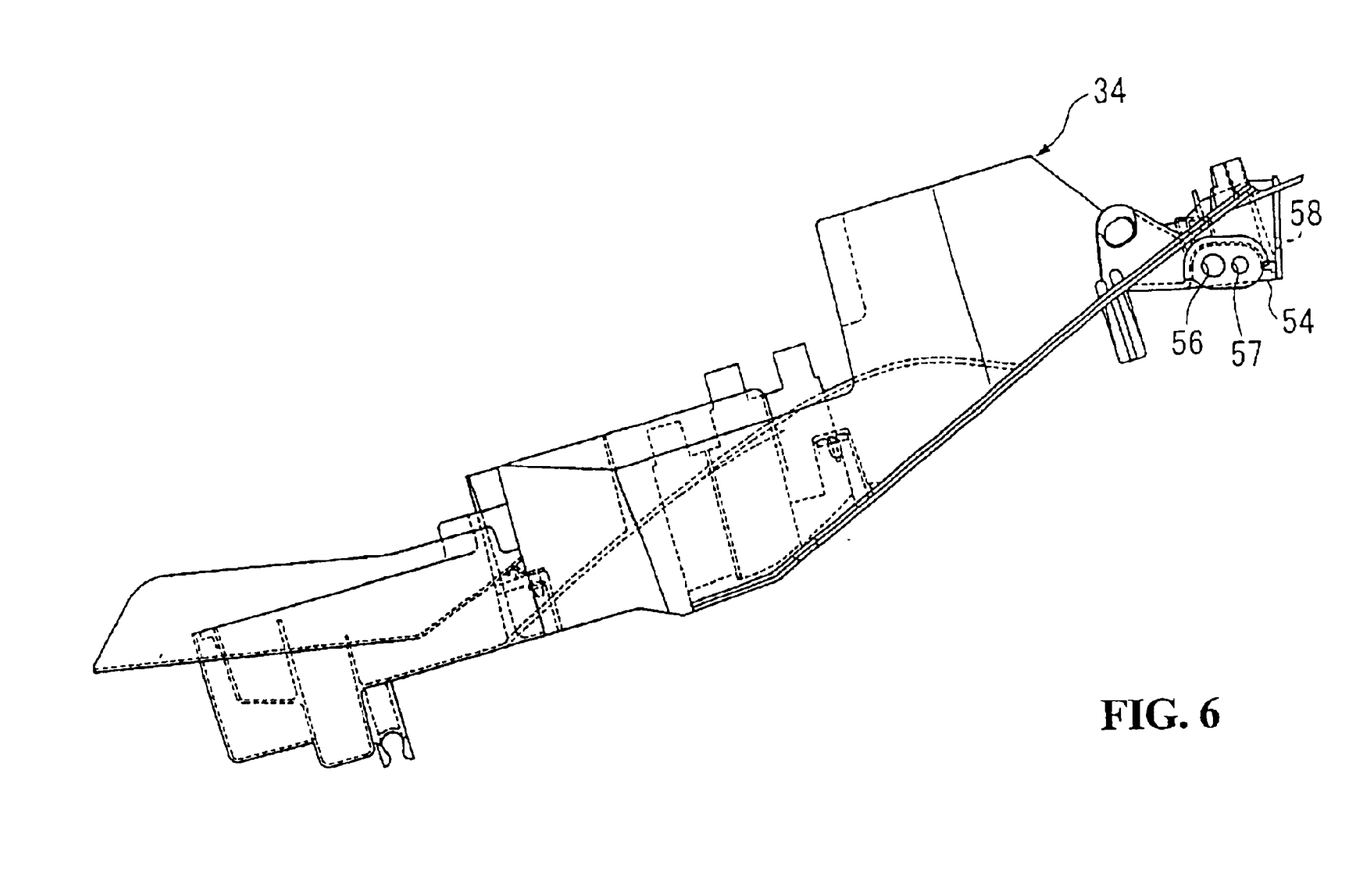
FIG. 6 is a side view showing the rear fender of the tail lamp structure for a motorcycle according to the first embodiment of the present invention.
Figure 7:
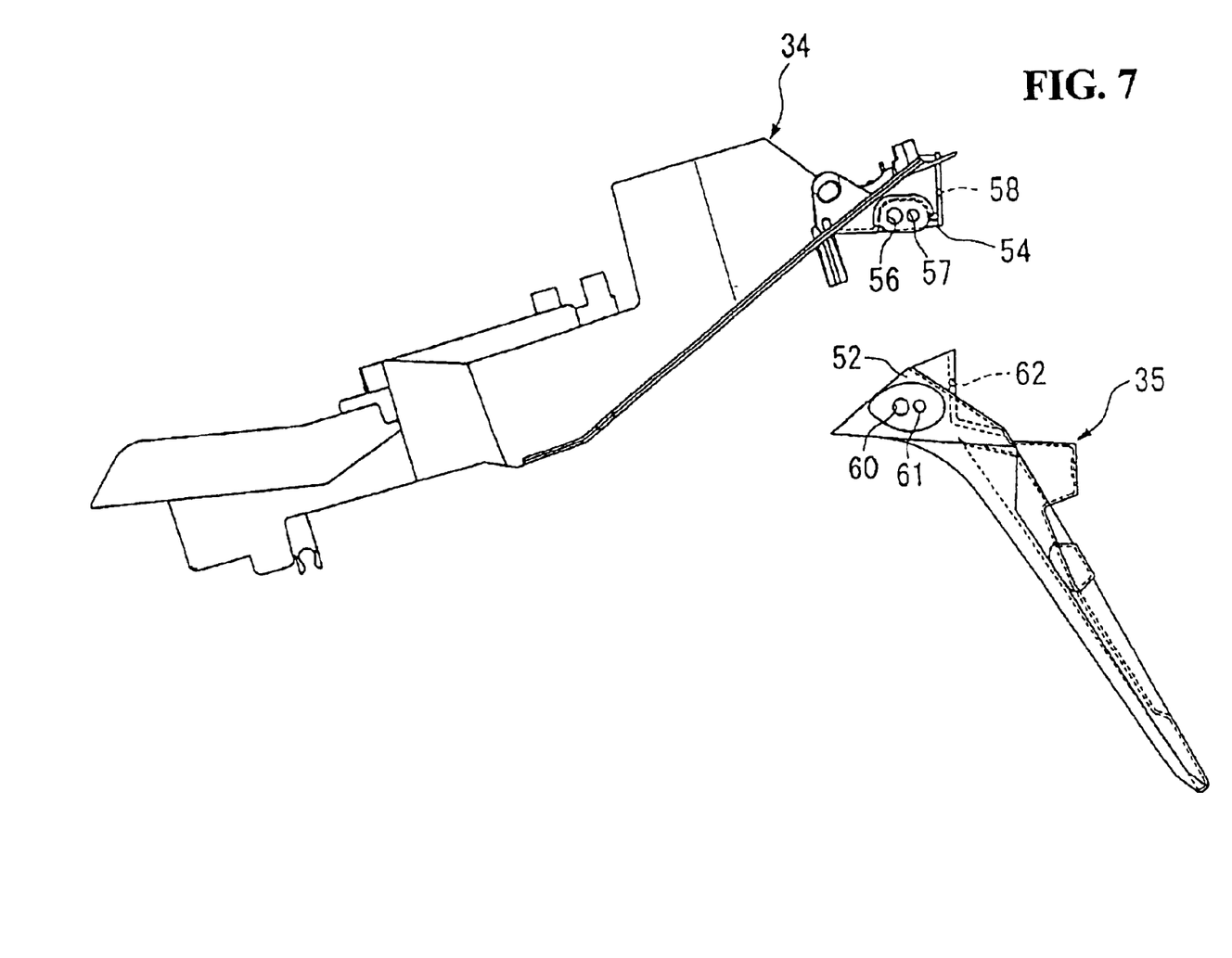
FIG. 7 is an exploded side view showing the rear fender of the tail lamp structure for a motorcycle according to the first embodiment of the present invention and another rear fender.
Figure 8:
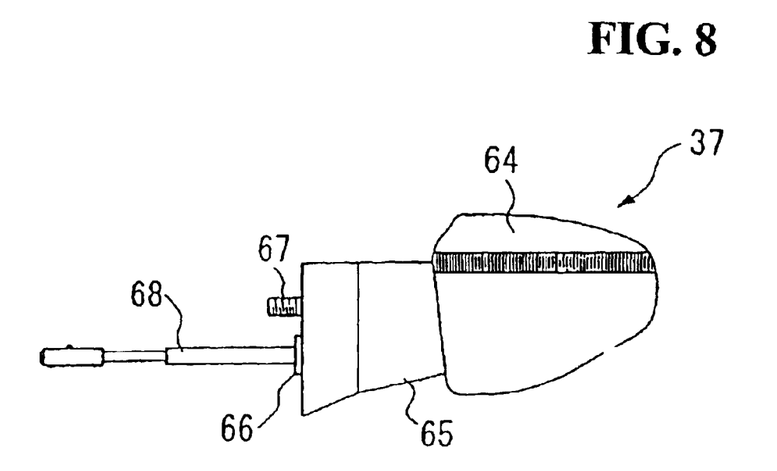
FIG. 8 is a plan view showing a rear blinker mounted to the rear fender of the tail lamp structure for a motorcycle according to the first embodiment of the present invention.
Figure 9:
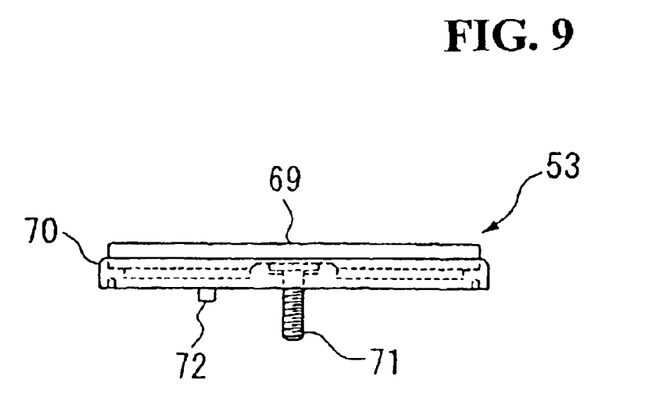
FIG. 9 is a plan view of a rear reflector mounted to the rear fender of the tail lamp structure for a motorcycle according to the first embodiment of the present invention.
Figure 10:
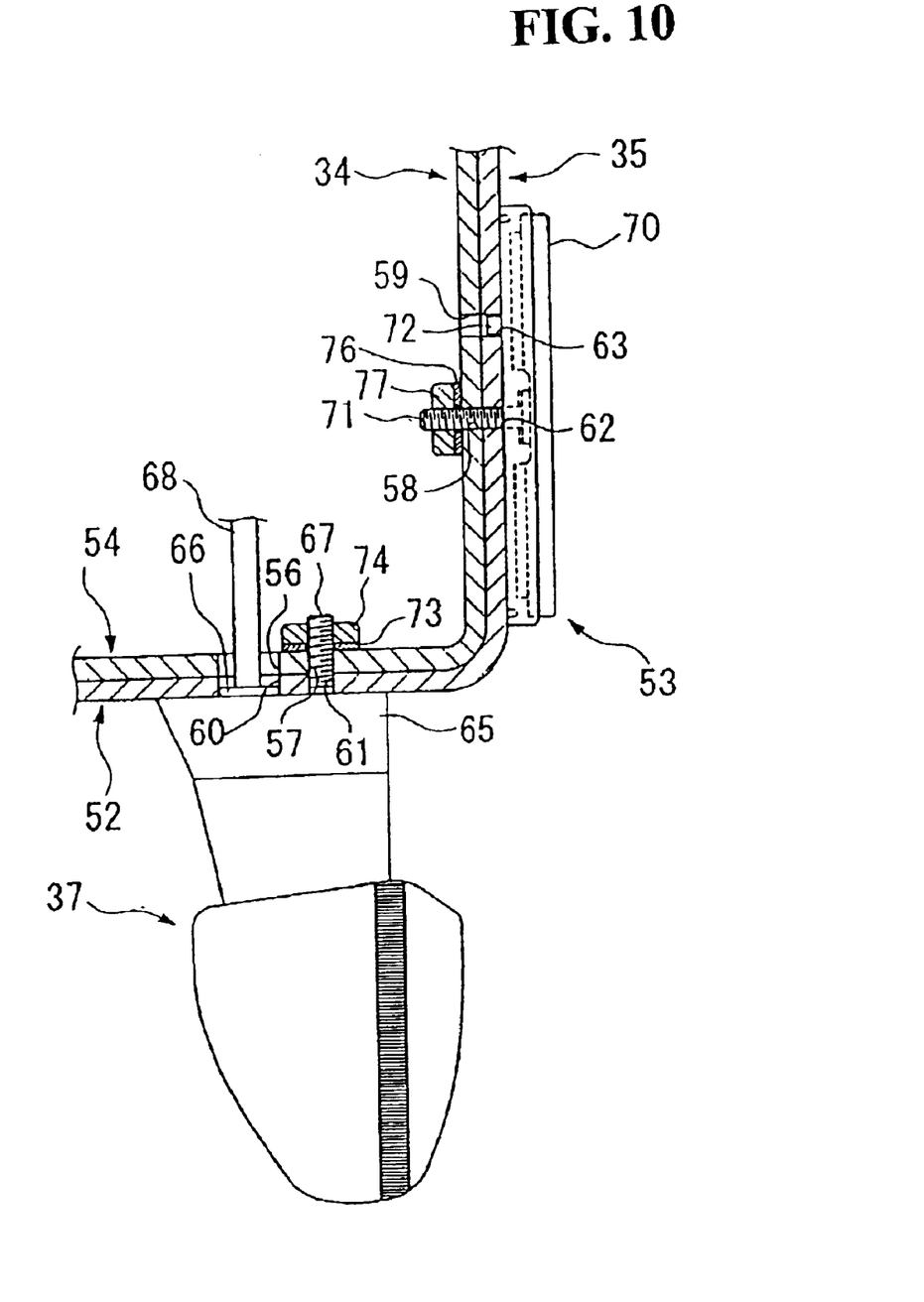
FIG. 10 is a partial sectional plan view of the rear fender of the tail lamp structure for a motorcycle according to the first embodiment of the present invention connected to another rear fender with rear blinkers and a rear reflector.
Figure 11:
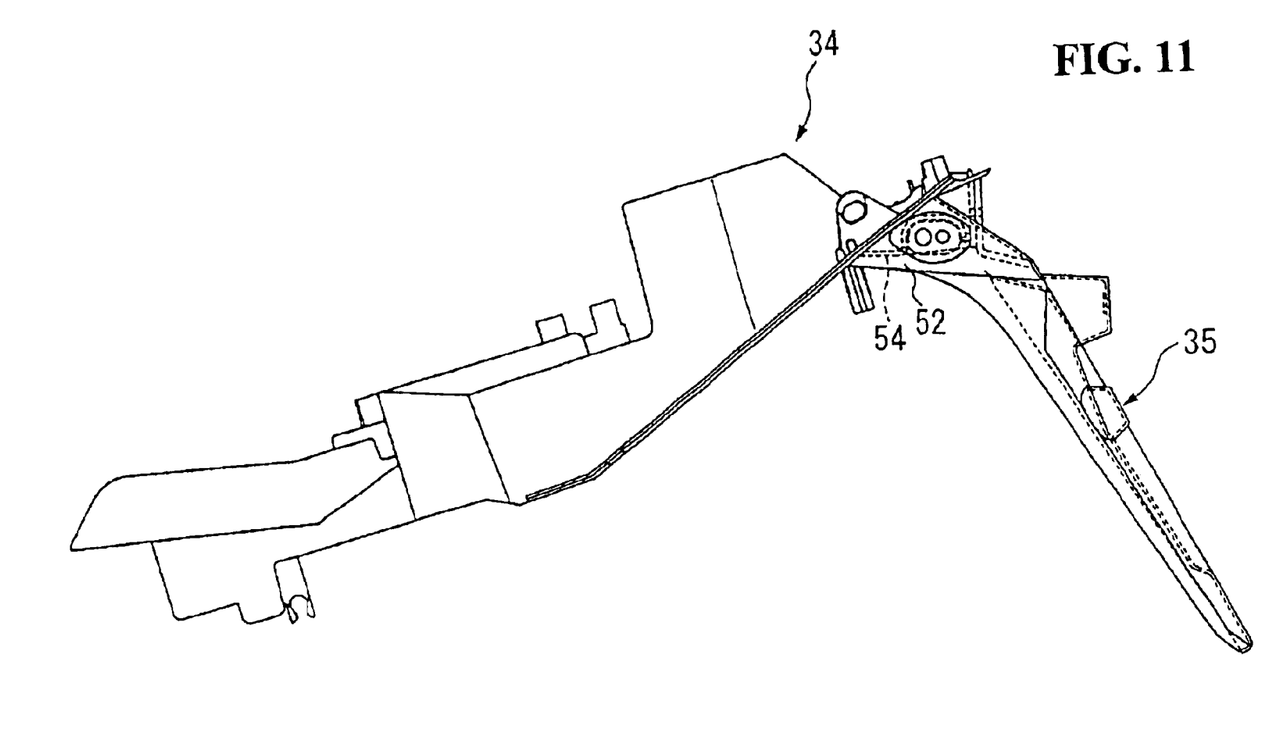
FIG. 11 is a side view showing a rear fender for the tail lamp structure for a motorcycle according to the first embodiment of the present invention fitted to another rear fender.

FIG. 1 is a side view showing a motorcycle incorporating a tail lamp structure according to a first embodiment of the present invention. FIG. 2 is a rear view showing the tail lamp structure for a motorcycle according to the first embodiment of the present invention. FIG. 3 is a side view showing the tail lamp structure for a motorcycle according to the first embodiment of the present invention. FIG. 4 is a plan view showing a rear cowl of the tail lamp structure for a motorcycle according to the first embodiment of the present invention. FIG. 5 is a plan view showing a rear fender of the tail lamp structure for a motorcycle according to the first embodiment of the present invention. FIG. 6 is a side view showing the rear fender of the tail lamp structure for a motorcycle according to the first embodiment of the present invention. FIG. 7 is an exploded side view showing the rear fender of the tail lamp structure for a motorcycle according to the first embodiment of the present invention and another rear fender. FIG. 8 is a plan view showing a rear blinker mounted to the rear fender of the tail lamp structure for a motorcycle according to the first embodiment of the present invention. FIG. 9 is a plan view of a rear reflector mounted to the rear fender of the tail lamp structure for a motorcycle according to the first embodiment of the present invention. FIG. 10 is a partial sectional plan view of the rear fender of the tail lamp structure for a motorcycle according to the first embodiment of the present invention connected to another rear fender with rear blinkers and a rear reflector. FIG. 11 is a side view showing a rear fender for the tail lamp structure for a motorcycle according to the first embodiment of the present invention fitted to another rear fender.

FIG. 1 is a side view showing a motorcycle incorporating a tail lamp structure according to a first embodiment of the present invention. A motorcycle 1 includes a body frame 2, a pair of left and right front forked portions 3 turnably supported by a front end portion of the body frame 2, and a pair of left and right handlebars 4 for steering mounted at upper ends of the front forked portions 3 in such a manner as to be located at an upper front portion of a vehicular body.

A front wheel 5 is rotatably supported by the front forked portions 3 and an engine 6 is supported by the body frame 2. A rear fork g is vertically and swingably supported by a radiator 7 disposed in front of the engine 6, a rear end of the engine 6, and the body frame 2. A rear wheel 9 is rotatably supported by a rear end portion of the rear fork 8 and a fuel tank 10 is disposed on an upper portion of the body frame 1. A main seat 11 for a driver and a pillion seat 12 for a passenger are disposed behind the fuel tank 10. The front portion of the vehicular body is nearly entirely covered with a front cowl 15. In addition, the pillion seat 12 is disposed on a rear cowl 13 provided behind the driver's seat 11.

The body frame 2 includes a head pipe 16, a pair of left and right main frames 17, a pair of left and right connection plates 19, and a pair of left and right seat rails 18. The head pipe 16 is disposed at a front end of the body frame 2. The main frames 17 branch rightward and leftward from the head pipe 16 and extend rearwardly, and obliquely downward therefrom. A front side engine hanger 17a is integrally provided on a front portion of each of the main frames 17 in such a manner as to extend downwardly therefrom. A rear side engine hanger 17b is integrally provided on a rear portion of the main frame 17 in such a manner as to extend downwardly. The connection plates 19 are connected to upper rear sides of the main frames 17.

The seat rails 18 are connected to the main frames 17 and the connection plates 19 in such a manner as to extend rearwardly, and obliquely upwardly. The seat rails 18 have a pair of left and right upper pipes 18a connected to the connection plates 19 and extending rearwardly, and obliquely upwardly therefrom. A pair of left and right lower pipes 18b are connected to connecting portions 20 provided at rear ends of the main frames 17 and extending rearwardly, and obliquely upwardly therefrom. Rear ends of the upper pipes 18a and the lower pipes 18b are welded to each other. A front end portion of the rear cowl 13 is connected to the connecting portions 20 of the main frames 17.

The engine 6 is a parallel, multi-cylinder, four-cycle engine including a cylinder block 22 having a cylinder head 21 and a crankcase 23 provided under the cylinder block 22 in such a manner as to be continuous therefrom. A plurality of cylinders are disposed in parallel in the lateral direction in the cylinder block 22. The engine 6 is supported by the body frame 2 in a state that the cylinder block 22 is tilted slightly forward. The cylinder block 22 is bolted on the front side engine hangers 17a of the main frames 17 to support the engine 6. An upper portion of a rear end of the crankcase 23 is bolted on the rear side engine hangers 17b of the main frames 17.

Exhaust pipes 25 are connected to a front portion of the cylinder block 22 and are in communication with respective cylinders (only one exhaust pipe 25 is shown in FIG. 1). The plurality of exhaust pipes 25 extend downwardly from end portions thereof connected to the cylinder block 22. The exhaust pipes 25 are put in order under the engine 6, are bent to extend rearwardly along a back surface of the crankcase 23, and are collected under a rear portion of the crankcase 23 into a common collecting pipe 26. The collecting pipe 26 is disposed on the right side of the rear wheel 9 while being raised rightwardly, and obliquely rearward.

The rear fork 8 has a base portion 30 at a front of the rear fork 8, from which a pair of left and right forked portions 31 extend rearward. The base portion 30 is pivotably supported by a pivot 6A provided at a rear end portion of the engine 6, whereby the rear fork 8 is vertically swingable around the pivot 6A. A rear shock absorber unit 32 for relieving and absorbing vibration applied from a road surface to the rear wheel 9 is interposed between the base portion 30 of the rear fork 8 and rear ends of the main frames 17. A rear fender 33 for covering an upper front portion of the rear wheel 9 is mounted to upper portions of the forked portions 31. A first rear fender 34 for covering an upper intermediate portion of the rear wheel 9 is mounted to a lower portion of the rear cowl 13. A second rear fender 35 for covering an upper rear portion of the rear wheel 9 is mounted to a rear portion of the first rear fender 34.

A pair of left and right front blinkers 36 are mounted to the front cowl 15, and a pair of left and right rear blinkers 37 are mounted to a boundary portion between the first rear fender 34 and the second rear fender 35. A tail lamp unit to which the tail lamp structure according to the first embodiment is applied and a peripheral portion of the tail lamp unit will be described hereinafter.

As shown in FIGS. 2 and 3, a tail lamp unit 40 according to the first embodiment is disposed inside a space surrounded by a rear end portion of the rear cowl 13 and a rear end portion of the first rear fender 34 disposed under the rear cowl 13. The rear end portion of the rear cowl 13 is formed into a shape having a lateral width becoming narrow toward an upper side, leading end of the rear cowl 13.

The rear end portion of the rear cowl 13, which covers the upper side of the tail lamp unit 40, has a tapered shape as described hereinafter. As seen from the rear side (see FIG. 2), the lateral width of the rear end portion of the rear cowl 13 becomes narrow toward the upper side, leading end of the rear cowl 13. As seen from the upper side (see FIG. 4), the lateral width of the rear end portion of the rear cowl 13 becomes narrow as toward a rear side, leading end of the rear cowl 13. As seen from the left or right side (see FIG. 3), the lateral width of the rear end portion of the rear cowl 13 becomes thin toward a rear side, leading end of the rear cowl 13. As shown in FIG. 4, the rear cowl 13 has two mounting portions 42 located on left and right sides of a longitudinally intermediate portion of the rear cowl 13.

The rear end portion of the first rear fender 34 covers, as shown in FIGS. 2 and 3, the lower side of the tail lamp unit 40. As seen from the upper side (see FIG. 5), the rear end portion of the first rear fender 34 has a taper shape becoming thinner toward a rear side, leading end of the first rear fender 34. As shown in FIG. 5, the first rear fender 34 has two mounting portions 43 located on left and right sides of a longitudinally intermediate portion of the first rear fender 34. In a state that the first rear fender 34 is disposed under the rear cowl 13, the mounting portions 43 of the first rear fender 34 are mounted to the mounting portions 42 of the rear cowl 13 by means of small screws or the like.

As shown in FIG. 3, the tail lamp unit 40, which is disposed in a space surrounded by the rear end portions of the rear cowl 13 and the first rear fender 34, has a front portion and a rear side. A lamp holding portion 45 is provided on the front portion and a lamp cover 46 is mounted on the rear side of the lamp holding portion 45. The lamp cover 46 has a tapered shape matched with the tapered shape of the rear cowl 13. As seen from the rear side (see FIG. 2), a lateral width of the lamp cover 46 also becomes narrow toward an upper side, leading end of the lamp cover 46. As seen from the left or right side (see FIG. 3), the lateral width of the lamp cover 46 becomes narrow as it nears a rear side, leading end of the lamp cover 46.

As shown in FIGS. 2 and 3, the lamp cover 46 is divided into an upper portion and a lower portion. A horizontally-elongated tail lamp portion 47 is disposed on the upper portion of the lamp cover 46, and a horizontally-elongated brake lamp portion 48 is disposed under the tail lamp portion 47. The tail lamp portion 47 lights up for signifying the presence of the motorcycle 1 to a vehicle running behind the motorcycle 1, and the brake lamp portion 48 lights up for signifying a braking operation of the motorcycle 1.

The lamp holding portion 45 includes only one row of a plurality of LEDs (Light Emitting Diodes) 50 arrayed on the lateral direction. The LEDs 50 used for the tail lamp portion 47 are located in the tail lamp portion 47 provided on the upper portion of the lamp cover 46. The lamp holding portion 45 also includes a plurality of vertical rows each having a plurality of LEDs 51 arrayed on the lateral direction. The LEDs 51 used for the brake lamp portion 48 are located in the brake lamp portion 48 provided on the lower portion of the lamp cover 46.

The first rear fender 34 has a mounting portion 54 on the lower side of a rear end portion. A mounting portion 52 of the second rear fender 35 shown in FIG. 7, the left and right rear blinkers 37 shown in FIG. 8, and a rear reflector 53 shown in FIG. 9 are mounted to the mounting portion 54 of the first rear fender 34. As shown in FIGS. 6 and 7, the mounting portion 54 has a first pair of left and right hole portions 56 passing through the mounting portion 54 in the lateral direction. The mounting portion 54 also has a second pair of left and right hole portions 57 passing through the mounting portion 54 in the lateral direction and aligned behind the first hole portions 56. The second hole portions 57 have diameters smaller than those of the first hole portions 56.

As shown in FIG. 2, the mounting portion 54 further includes a hole portion 58 at its rear portion and a hole portion 59 having a diameter smaller than that of the hole portion 58. The hole portions 58, 59 are adjacent to each other in the lateral direction and pass through the mounting portion 54 in the longitudinal direction. As seen in FIG. 7, the mounting portion 52 of the second rear fender 35 is fitted to the outer side of the mounting portion 54 of the first rear fender 34. As seen in FIG. 10, the mounting portion 52 has a pair of left and right hole portions 60 having the same diameters as those of the hole portions 56 on the first rear fender 34 side and a pair of left and right portions 61 having the same diameters as those of the hole portions 57 on the first rear fender 34 side.

When the mounting portion 52 of the second rear fender 35 is fitted to the mounting portion 54 of the first rear fender 34, the hole portions 60 on the second rear fender 35 side are disposed coaxially with the hole portions 56 on the first rear fender 34 side. In addition, the hole portions 61 on the second rear fender 35 side are disposed coaxially with the hole portions 57 on the first rear fender 34 side. The mounting portion 52 of the second rear fender 35 also has a hole portion 62 having the same diameter as that of the hole portion 58 on the first rear fender 34 side, and a hole portion 63 having the same diameter as that of the hole portion 59 on the first rear fender 34 side. When the mounting portion 52 of the second rear fender 35 is fitted to the mounting portion 54 of the first rear fender 34, the hole portion 62 on the second rear fender 35 side is disposed coaxially with the hole portion 58 on the first rear fender 34 side. In addition, the hole portion 63 on the second rear fender 35 side is disposed coaxially with the hole portion 59 on the first rear fender 34 side.

As shown in FIG. 8, each of the rear blinkers 37 has a rear blinker main body 65 having a light emission portion 64. A positioning/fitting portion 66 is provided on the front side of a side portion of the rear blinker main body 65. The positioning/fitting portion 66 has a diameter slightly smaller than that of each of the large-diameter hole portion 56 of the first rear fender 34 and the large-diameter hole portion 60 of the second rear fender 35. A wiring line 68 is inserted in the positioning/fitting portion 66. A screw shaft portion 67 is provided on the rear blinker main body 65 at a position behind the positioning/fitting portion 66. The screw shaft portion 67 has a diameter slightly smaller than that of each of the small-diameter hole portion 57 of the first rear fender 34 and the small-diameter hole portion 61 of the second rear fender 35.

As shown in FIG. 9, the rear reflector 53 has a plate-shaped rear reflector main body 70 having on its one side a reflecting portion 69, a screw shaft portion 71 projecting from a central portion of the rear reflector main body 70, and a positioning pin 72 provided adjacently to the screw shaft portion 71. The screw shaft portion 71 has a diameter slightly smaller than that of each of the hole portion 58 of the first rear fender 34 and the hole portion 62 of the second rear fender 35. The positioning pin 72 has a diameter slightly smaller than that of each of the hole portion 59 of the first rear fender 34 and the second hole portion 63 of the second rear fender 35.

Each of the left and right rear blinkers 37 is mounted to the first rear fender 34 and the second rear fender 35 as follows. First, as shown in FIG. 11, the mounting portion 52 of the second rear fender 35 is fitted to the mounting portion 54 of the first rear fender 34. In this state, as shown in FIG. 10, the positioning/fitting portion 66 of the rear blinker 37 is fitted in the front side hole portion 60 of the second rear fender 35 and at the same time the wiring line 68 extending from the inside of the positioning/fitting portion 66 is inserted in the hole portion 56 of the first rear fender 34 and the hole portion 60 of the second rear fender 35. The screw shaft portion 67 is inserted in the rear side hole portion 57 of the first rear fender 34 and the rear side hole portion 61 of the second rear fender 35. A nut member 74 is screwed with a projecting leading end of the screw shaft portion 67 via a washer member 73, whereby the first rear fender 34 and the second rear fender 35 are clamped by the rear blinker main body 65 and the nut member 74.

Next, the screw shaft portion 71 of the rear reflector 53 is inserted in the hole portion 58 of the first rear fender 34 and the hole portion 62 of the second rear fender 35. The positioning pin 72 of the rear reflector 53 is fitted in the hole portion 63 of the second rear fender 35. A nut member 77 is fastened with a projecting leading end of the screw shaft portion 71 via a washer member 76, whereby the first rear fender 34 and the second rear fender 35 are clamped by the rear reflector main body 70 and the nut member 77.

In this way, the left and right rear blinkers 37 and the rear reflector 53 are mounted to the first rear fender 34 and the second rear fender 35. At the same time, the second rear fender 35 is mounted to the first rear fender 34. Specifically, the second rear fender 35 extending downwardly from the rear end portion of the first rear fender 34 is mounted to the first rear fender 34 for covering the lower side of the rear cowl 13 by the left and right rear blinkers 37 and the rear reflector 53.

In this embodiment, the diameter of the hole portion 56 of the first rear fender 34 is the same as that of the hole portion 60, i.e., disposed coaxially with the hole portion 56, of the second rear fender 35. The diameter of the hole portion 57 of the first rear fender 34 is the same as that of the hole portion 61, i.e., disposed coaxially with the hole portion 57, of the second rear fender 35. The diameter of the hole portion 58 of the first rear fender 34 is the same as that of the hole portion 62, i.e., disposed coaxially with the hole portion 58, of the second rear fender 35. The hole portion 59 of the first rear fender 34 is the same as that of the hole portion 63, i.e., disposed coaxially with the hole portion 59, of the second rear fender 35.

Accordingly, even if the second rear fender 35 is not mounted to the first rear fender 34, the left and right blinkers 37 can be mounted via the hole portions 56 and 57 to the mounting portion 42 of the first rear fender 34. The rear reflector 53 can be mounted via the hole portions 58 and 59 to the first rear fender 34, whereby the structure can be easily changed into a racing structure with no second rear fender 35.

As seen in FIG. 2, since the tail lamp portion 47 is disposed on the upper portion of the tail lamp structure and the brake lamp portion 48 is disposed under the tail lamp portion 47, even if the tail lamp structure is disposed inside the rear end portion of the rear cowl 13, the lighting area of the brake lamp portion 48 is not reduced in size. As a result, it is possible to ensure a sufficient lighting area of the brake lamp portion 48.

As described above, according to the tail lamp structure for a motorcycle of the present invention, since a tail lamp portion is disposed on an upper portion of the tail lamp structure and a brake lamp portion is disposed under the tail lamp portion, even if the tail lamp structure is disposed inside the rear end portion of a rear cowl, and the rear end portion of the rear cowl has a shape whose lateral width becomes narrow toward the upper end of the rear cowl, the lighting area of the brake lamp portion is not reduced. As a result, it is possible to ensure a sufficient lighting area of the brake lamp portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tail lamp structure for a motorcycle, said tail lamp structure comprising:

a tail lamp unit having an upper tail lamp portion and a lower tail lamp portion;

a rear cowl having a rear end portion and an upper end, said rear end portion having a tapered shape with a lateral width narrowing toward the upper end of said rear cowl; and a tail lamp being disposed in the upper tail lamp portion and a brake lamp being disposed in the lower tail lamp portion, wherein the lower tail lamp portion is larger than the upper tail lamp portion.

2. The tail lamp structure according to claim 1, further comprising a pair of mounting portions on left and right sides of a longitudinally intermediate portion of the rear cowl.

3. The tail lamp structure according to claim 1, wherein said tail lamp unit includes a front portion and a rear side.

4. The tail lamp structure according to claim 3, further comprising:
   a lamp holding portion provided on the front portion of the tail lamp unit; and
   a tail lamp cover mounted on the rear side of the tail lamp unit, said tail lamp cover having a tapered shape corresponding to the tapered shape of the rear cowl.

5. The tail lamp structure according to claim 4, the lamp holding portion including a row of LEDs in an upper portion of the lamp cover forming said tail lamp.

6. The tail lamp structure according to claim 4, the lamp holding portion including rows of brake lamp LEDs arrayed in a lateral direction, said LEDs for the brake lamp being provided in a lower portion of the lamp cover.

7. A tail lamp structure for a motorcycle having a first rear fender and a second rear fender, wherein said second rear fender is mounted to a rear portion of the first rear fender, said tail lamp structure comprising:
   a tail lamp unit having an upper tail lamp portion and a lower tail lamp portion;
   a rear cowl having a rear end portion and an upper end, said rear end portion having a tapered shape with a lateral width narrowing toward the upper end of said rear cowl; and
   a tail lamp being disposed in the upper tail lamp portion and a brake lamp being disposed in the lower tail lamp portion; and
   a pair of left and right rear blinkers mounted to a boundary portion between the first rear fender and the second rear fender.

8. The tail lamp structure according to claim 7, wherein the tail lamp unit is disposed in a space formed between the rear end portion of the rear cowl and a rear end portion of the first rear fender disposed beneath the rear cowl.

9. The tail lamp structure according to claim 7, further comprising a pair of mounting portions on left and right sides of a longitudinally intermediate portion of the rear cowl.

10. The tail lamp structure according to claim 7, wherein a rear end portion of the second rear fender covers the lower tail lamp portion of the tail lamp unit.

11. The tail lamp structure according to claim 7, wherein a rear end portion of the first rear fender covers the upper tail lamp portion of the tail lamp unit.

12. The tail lamp structure according to claim 7, wherein the first and second rear fenders each have a tapered shape, said tapered shapes of said first and second rear fenders narrowing toward the rear end portion of the rear cowl.

13. The tail lamp structure according to claim 7, wherein said tail lamp unit includes a front portion and a rear side.

14. The tail lamp structure according to claim 13, further comprising:
   a lamp holding portion provided on the front portion of the tail lamp unit; and
   a tail lamp cover mounted on the rear side of the tail lamp unit, said tail lamp cover having a tapered shape corresponding to the tapered shape of the rear cowl.

15. The tail lamp structure according to claim 14, the lamp holding portion including a row of LEDs in an upper portion of the lamp cover forming said tail lamp.

16. The tail lamp structure according to claim 14, the lamp holding portion including rows of brake lamp LEDs arrayed in a lateral direction, said LEDs for the brake lamp being provided in a lower portion of the lamp cover.

17. The tail lamp structure according to claim 15, the lamp holding portion including rows of brake lamp LEDs arrayed in a lateral direction, said LEDs for the brake lamp being provided in a lower portion of the lamp cover.

18. The tail lamp structure according to claim 5, the lamp holding portion including rows of brake lamp LEDs arrayed in a lateral direction, said LEDs for the brake lamp being provided in a lower portion of the lamp cover.

19. The tail lamp structure according to claim 1, wherein the lower tail lamp portion is positioned forward of the upper tail lamp portion within the tail lamp unit.

* * * * *